US009277410B2

(12) United States Patent
Rodriguez Crespo et al.

(10) Patent No.: US 9,277,410 B2
(45) Date of Patent: Mar. 1, 2016

(54) METHOD AND DEVICE FOR LOCATING NETWORK ACTIVITY IN CELLULAR COMMUNICATION NETWORKS

(71) Applicant: TELEFONICA DIGITAL ESPANA, S.L.U., Madrid (ES)

(72) Inventors: Miguel Angel Rodriguez Crespo, Madrid (ES); David Diaz Vico, Madrid (ES); Rocio Martinez Lopez, Madrid (ES)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 0 days.

(21) Appl. No.: 14/533,409

(22) Filed: Nov. 5, 2014

(65) Prior Publication Data
US 2015/0126204 A1    May 7, 2015

(30) Foreign Application Priority Data

Nov. 5, 2013  (EP) .................................... 13382445

(51) Int. Cl.
*H04W 40/00*    (2009.01)
*H04W 16/06*    (2009.01)
*H04W 16/30*    (2009.01)
*H04W 16/18*    (2009.01)

(52) U.S. Cl.
CPC .............. *H04W 16/06* (2013.01); *H04W 16/18* (2013.01); *H04W 16/30* (2013.01)

(58) Field of Classification Search
CPC ...... H04W 16/18; H04W 16/32; H04W 72/04
USPC ......................................... 455/446, 449, 450
See application file for complete search history.

(56) References Cited

U.S. PATENT DOCUMENTS

| 6,404,386 | B1* | 6/2002 | Proctor et al. ................. 342/368 |
| 6,853,845 | B2 | 2/2005 | Hsu et al. |
| 8,385,927 | B2 | 2/2013 | Pfeiffer |
| 8,437,765 | B2 | 5/2013 | Yang et al. |
| 8,712,438 | B1* | 4/2014 | McMullen et al. ........ 455/456.2 |
| 2003/0211831 | A1* | 11/2003 | Xu et al. ...................... 455/63.3 |
| 2003/0220774 | A1 | 11/2003 | Fattouch et al. |
| 2004/0224696 | A1* | 11/2004 | Korneluk et al. ............. 455/449 |

(Continued)

FOREIGN PATENT DOCUMENTS

| DE | 196 17 440 | 11/1997 |
| DE | 10 2007 008 196 | 8/2008 |
| WO | 2013/071771 | 5/2013 |

OTHER PUBLICATIONS

European Search Report dated Jun. 12, 2014 from corresponding Application No. 13382445.8.

*Primary Examiner* — Danh Le
(74) *Attorney, Agent, or Firm* — Katten Muchin Rosenman LLP (57) ABSTRACT

A method and a device for optimizing the assignation of network activity of a cellular communications network to land areas in a simple and accurate way. This technique allows representing the activity of a cellular network on a set of tiles in a grid covering a certain land area, instead of representing it associated to antenna cells that might or might not overlap. The activity dispersed and assigned to non-overlapping grid tiles is much simpler and clearer to understand and allows visualizing how the network activity is distributed over the space and how it varies along time allowing therefore an efficient network design and management optimization.

15 Claims, 4 Drawing Sheets

(56) References Cited

U.S. PATENT DOCUMENTS

2006/0121906 A1* 6/2006 Stephens et al. ............. 455/446
2007/0281705 A1* 12/2007 Bosenbecker ................ 455/445
2010/0117898 A1* 5/2010 Wigren ................... 342/357.09
2012/0295536 A1* 11/2012 Klatt ............................ 455/3.01
2013/0109405 A1* 5/2013 Siomina et al. ............ 455/456.1
2014/0126403 A1* 5/2014 Siomina ........................ 370/252
2014/0128115 A1* 5/2014 Siomina et al. ............... 455/501

* cited by examiner

METHOD AND DEVICE FOR LOCATING NETWORK ACTIVITY IN CELLULAR COMMUNICATION NETWORKS

TECHNICAL FIELD OF THE INVENTION

The present invention relates to a method and device for locating network activity in cellular communication networks and more particularly, to a method and device that allow to assign network activity of a wireless communication network to specific land areas inside the coverage area of a cellular communication network. Said assignation is very important for the optimization of the wireless access network.

BACKGROUND OF THE INVENTION

Wireless communication networks (as for example 2G, 3G, 4G, 5G, LTE networks, WIFI networks) are rolled out in many parts of the developed world and the traffic they manage is continuously increasing. Said networks are radio network that provides coverage over different land areas called cells each served by means of at least one fixed-location transceiver (including an antenna for transmission/reception) known as base station or cell site (this type of networks are also called cellular communications networks). Usually, to avoid interference and to provide guaranteed bandwidth within each cell, each cell uses a different set of frequencies from neighboring cells. When joined together, these cells provide radio coverage over a wide geographic area.

Each cell (also called antenna cell) is assumed to give coverage to a certain area, which can be represented by a coverage polygon associated to that cell. But the same area (or part of it) can also be covered by other cells in order to give redundancy and make the network more robust to cell failures. So, the network coverage can be globally represented by a huge amount of overlapping coverage polygons (each one associated to one cell).

The radio access network is the most complex and expensive part of a mobile network, so it has to be carefully designed (number of cells, location of each cell, TX/RX capacity of each cell . . . ). Operators use radio network planning tools for this purpose. However, the traffic managed by each cell of the network is not fixed but changes significantly in short period of times (for example, due to the appearance of new services or to the celebration of a massive event or because a new building is built in a certain area or for many other reasons). So it is not enough to have a good design at the beginning of the deployment of the network but said design must be optimized every certain (short) period of time to assure that the quality of service offered to the user is maintained. For example, some new cells must be added in certain zones where the traffic has increased, some existing cells must be moved or removed, the capacity of the cells must be increased o decreased, some working parameters of the cells must be changed . . . . And, of course, said optimization must be done maintaining the quality of service and minimizing the radio resources used (as they are very expensive for the network operator).

In order to perform said radio access network optimization it is fundamental to have updated information about the network activity in the coverage area. The network activity can be defined as the usage of the network resources (for example in a certain zone or in a certain cell). This network activity depend on many different parameters and it can be therefore measured directly or indirectly in many different ways, for example, the traffic load and/or the number of calls and/or the bandwidth occupied and/or number of SMSs or number of users using a certain communications service . . . .

The normal operation of cellular networks registers the activity that is being processed by each individual cell at a certain time. But it is not obvious to have a mapping from the cell activity to the terrain. Though the antenna is known to be geographically located in a certain place, the activity processed by that antenna really can take place at any point inside its coverage area. That is, the cell does not give further information about how said activity is distributed inside its coverage area.

And furthermore, the coverage areas of the cells are overlapped. Actually many of the areas inside the network coverage area (especially in high traffic zones as cities) are covered by more than one cell, making even more difficult to exactly know the network activity in a certain area inside the network coverage area.

Having a set of cells that produces overlapping coverage over a geographic area makes difficult to have a clear view of which resulting network activity takes place in a certain portion of the land area. It is much easier to represent and understand the network activity if it is assigned to non-overlapping portions covering the whole wide area of interest. For example, the wide area of interest can be segmented into tiles using a grid. However, simplifications that force that no overlapping exists between antenna cell coverage areas (as with a pure Voronoi tessellation) are unrealistic. So, a method is needed to obtain the coverage in non-overlapping tiles from antenna cells whose coverage may overlap as it usually occurs.

There are some prior art proposals which disclose techniques to map somehow the cell activity to the terrain.

For example, U.S. Pat. No. 8,437,765B2 shows a method that involves identifying the mobile devices within a geographical area associated with a carrier network. The values to the small cells are assigned based on the network statistics. The geographical area is divided into the cells. A grid map is created for the geographical area. The grid map is divided into grids based on a coverage area associated with one of the small cells. The total values for the grids are calculated based on the assigned values. The grids are selected to place the small cells based on the total values.

U.S. Pat. No. 6,853,845B2 shows a method and system to determine an enhanced cell coverage locating a mobile terminal in a cellular mobile communication system. The geographical area is divided into pixels. The nearest antenna is found for every pixel and all pixels assigned to an antenna constitute the antenna cell. A rectangular area covering this area is constructed, and the smallest circle that covers it is the enhanced cell of the antenna.

But none of the prior art solutions solves successfully the above stated problems of mapping the network activity in non-overlapping areas. Furthermore, current solutions do not take into account the following facts:

The terrain has different features (lakes, buildings, roads . . . ) that influence how much network activity can be assigned to a particular grid tile, depending on how many people use to be populating that grid. Two different tiles, in spite of having the same area and being covered by the same set of cells, can receive different quantities of network activity depending of its land use information.

The coverage associated to each network cell is known to vary depending on the distance from the antenna. So it is unsatisfactory to consider a uniform coverage inside a single coverage polygon associated to one cell.

Hence, it is necessary a technique that assigns as exactly and efficiently as possible the network activity to land areas (e.g. in a map) to allow an optimization of the radio access design and management taking into account as much as possible the real and updated distribution of the network activity in the coverage area. The proposed embodiments of the invention stated below will provide said mechanisms, overcoming at least some of the drawbacks of the prior art solutions.

SUMMARY OF THE INVENTION

The problems found in prior art techniques are generally solved or circumvented, and technical advantages are generally achieved, by the disclosed embodiments which provide a method and device for locating network activity in wireless communication networks to land areas. The present invention allows to assign network activity to land areas (taking into account among other things, the physical characteristics of the land) as exactly as possible, allowing therefore an efficient network design and updating and management optimization.
In a first aspect, it is provided a method for assigning network activity of a cellular communications network to land areas of a certain area of interest, said cellular communications network serving a group of cells each one being served by at least one antenna, the method comprising the following steps performed by an electronic device:
a) For each cell of the group of cells, obtaining cell information and information of the cell coverage as a function of the distance from the antenna, where said cell information includes location information of the antenna serving the cell
b) Dividing said area of interest into a set of adjacent non intersecting zones called tiles (e.g. said tiles forming a grid) and assigning to each tile a land use factor, being said land use factor a parameter which indicates the portion of the tile area where it is possible to have network activity
c) For each cell of the group of cells, defining a cell coverage polygon
d) For each cell coverage polygon, defining one or more sub-polygons according to the information of the cell coverage as a function of the distance from the antenna and assigning to each sub-polygon a distance factor being said distance factor a parameter which indicates the portion of the cell activity that it is assigned to each sub-polygon (said distance factor may be calculated according to the information of the cell coverage as a function of the distance from the antenna)
e) Calculating intersection areas between each tile and each cell sub-polygon and weighting each intersection area by the tile land use factor of the correspondent tile.
f) For each tile and each cell, determining a dispersion of the network activity of said cell in said tile based on the weighted intersection areas between said grid tile and the sub-polygons of said cell and the distance factor assigned to each sub-polygon of said cell.
The method may further comprises: creating a table with contains, for all the combination of cells and grid tiles that have an intersection, the dispersion value for said cell and said tile.
Optionally, the method may further comprises: obtaining the network activity of a particular tile by, for each cell with any of its sub-polygons having an intersection with the tile, applying the dispersion value for said grid tile and for said cell to the network activity of said cell and adding the obtained results for all the cells with any of its sub-polygons having an intersection with the tile.
In an embodiment, the step of determining the dispersion of the network activity for each grid tile and each cell comprises:
f1) For each grid tile and each cell, calculating a partial dispersion factor for each sub-polygon of said cell as the weighted intersection area between said grid tile and said sub-polygon multiplied by the distance factor of said sub-polygon and divided by the sum of all the weighted intersection areas of said sub-polygon of said cell with any tile
f2) Calculating the dispersion of the network activity for each combination of grid tile and cell as the sum of the partial dispersion factors of all the sub-polygons of said cell which intersects with said tile.
The cell information may also include at least one of the following: a cell identifier, type of the cell, type of antenna, type of technology used by the cellular communications network, azimuth and beam width.
The electronic device may be installed in one node of the cellular communications network.
The coverage polygons may be generated using at least part of the cell information obtained in step a)
For generating the cell coverage polygons, Voronoi polygons or circular sectors polygons may be used and said coverage polygons may be generated according to the cell type of antenna.
Said coverage polygons may be divided in layers according to different types of technology used in the cells.
In an embodiment, if, according to the information of coverage as a function of the distance, it is considered that the coverage of a certain cell is constant in all the cell independent on the distance to the antenna, only one sub-polygon is defined for said cell, being said sub-polygon equal to the cell coverage polygon and it is assigned a distance factor of 1 to said sub-polygon.
The cell information and the information of the cell coverage as a function of the distance from the antenna may be obtained from nodes of the cellular network, for example, being transmitted to the electronic device by a node of the cellular communications network.
Each tile may be defined by its location and the size and shape of the tile.
In another aspect, it is provided an electronic device for assigning network activity of a cellular communications network to land areas of a certain area of interest, where said area of interest is divided into a set of adjacent non intersecting zones called tiles, said cellular communications network serving a group of cells each one being served by at least one antenna, the electronic device comprising:
a) Means for, for each cell of the group of cells, obtaining cell information and information of the cell coverage as a function of the distance from the antenna, where said cell information includes location information of the antenna serving the cell
b) Means for assigning to each tile a land use factor, being said land use factor a parameter which indicates the portion of the tile area where it is possible to have network activity
c) Means for, for each cell of the group of cells, defining a cell coverage polygon
d) Means for, for each cell coverage polygon, defining one or more sub-polygons according to the information of the cell coverage as a function of the distance from the antenna and assigning to each sub-polygon a distance factor being said distance factor a parameter which indicates the portion of the cell activity that it is assigned to each sub-polygon
e) Means for calculating intersection areas between each tile and each cell sub-polygon and weighting each intersection area by the land use factor of the correspondent tile.
f) Means for, for each tile and each cell, determining a dispersion of the network activity of said cell in said tile based on the weighted intersection areas between said grid tile and the sub-polygons of said cell and the distance factor assigned to each sub-polygon of said cell.
According to another aspect of the invention, a computer program product is provided, comprising computer-executable instructions for performing any of the method previously disclosed, when the program is run on a computer and a digital data storage medium is also provided encoding a machine-executable program of instructions to perform any of the methods disclosed.

Consequently, according to the invention, a method, a device, a computer program and a data storage medium according to the independent claims are provided. Favorable embodiments are defined in the dependent claims.

These and other aspects of the invention will be apparent from and elucidated with reference to the embodiments described hereinafter.

DESCRIPTION OF THE DRAWINGS

To complete the description that is being made and with the object of assisting in a better understanding of the characteristics of the invention, in accordance with a preferred example of practical embodiments thereof, accompanying said description as an integral part thereof, is a set of drawings wherein, by way of illustration and not restrictively, the following has been represented.

DETAILED DESCRIPTION OF THE INVENTION

The present invention may be embodied in other specific devices, systems and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

In the present text, the terms "cell site", "base station" and "antenna" are going to be used indistinctly to refer to the same concept, the one fixed location transceiver serving a cell.

The present invention proposed a technique for obtaining the network cell activity of a cellular communication network of the tiles of a grid spanning over a geographic area.

Said cellular communications network can be a mobile communications network (as for example 2G, 3G, 4G, 5G, LTE networks . . . ) or any other type of cellular networks (as for example WIFI networks).

User equipment may include any device capable of transmitting and receiving data (e.g., voice, text, images, and/or multimedia data) over the cellular communications network. For example, user equipment 110 may be a mobile telephone, a smart phone, an electronic notepad, a personal digital assistant (PDA), a tablet, a laptop, a personal computer . . . .

As it will be explained more detailed below, in an embodiment, the way of representing this dispersion of activity from cells to grid tiles is to indicate (for example in a lookup table) which portion of the activity from each antenna cell should go to each grid tile. One cell contributes activity to the grid tiles that spatially intersect with the coverage polygon associated to that cell.

As the coverage inside an antenna cell polygon is known to be non-uniform because it depends on the distance from the antenna, this information can be used to split the single coverage polygon into several parts (sub-polygons) that are built taking into account the information of coverage as a function of the distance.

The portion of activity contributed from one cell to one grid tile depends on the size of the intersecting area between the polygon cell and the grid tile, but also on a land use factor calculated for each grid tile. The total activity assigned to one grid tile will be the addition of the activity from all its contributing cells. The resulting final lookup table from cell to grid will be used for propagating network activity (or user network activity) from cell level to grid level. For example it can be used to represent footfall activity, call activity, transient activity, message activity, etc.

The proposed technique may be divided in the following main steps which are described below:
  Obtain and prepare cell information
  Obtain and prepare grid information (including the land use factor)
  Define cell coverage polygons
  Optionally, subdividing the cell coverage polygons in smaller (sub)polygons according to the information of coverage as a function of the distance from the antenna
  Calculate partial dispersion factors from land use weighted intersection areas between cell coverage polygons and grid tiles
  Obtain final dispersion factors from each cell to each grid tile and optionally create the cell to grid lookup table All this steps may be performed by an electronic device. In an embodiment said electronic device has means to perform the step of the method. In an embodiment, said electronic device comprises a processor storing instructions, said processor performing the steps of the method when executing said instructions. Said electronic device may be installed in a node of the cellular communications network. In an alternative embodiment, the electronic device performing the steps of the method may be installed in an external node. In both cases, the electronic device must obtain somehow the information of the cellular communications network, necessary to perform the method. This must be done, for example, establishing a communication between the electronic device and one or more nodes of the cellular communication network to request and receive said necessary information.

In an embodiment, not all the steps are performed in the same device but several devices are involved (each one performing one or more steps and exchanging information with the rest of the nodes involved).

Obtain and Prepare Cell Information

At least the antenna locations (and usually also the cell identifier, cell_ID) need to be known for each cell but there is also more information which could be necessary (because it is used to later obtain the coverage polygon for each antenna cell as it will be explained later), for example: type of the cell or type of antenna (omnidirectorial, sectored . . . ), type of technology (2G, 3G . . . ), information related to the coverage area as azimuth (angle relative to the North indicating the direction to which the antenna is radiating) and beam width (width of the radiation lobe oriented to the azimuth) . . . .

The cell information is obtained from the operator of the cellular network. Said information may be registered in one of the core network nodes and can be transmitted (for example, by the communications network or via another communications network) to the node in charge of performing this step of the method of the present invention.

The information about the location of the antenna (the cell site or base station location) is usually expressed in longitude and latitude coordinates referred to a World Geodetic System (p.e. WGS84 datum). Of course, any other known way of expressing the location of the base stations can be used. In an embodiment, the location coordinates are transformed to planar Cartesian coordinates (x and y expressed in meters) to allow an easier application of geometric calculations (distances, intersections, areas . . . ).

The information of cell coverage as a function of the distance from the cell site may be also collected. This information may be expressed as a set of distance thresholds from the cell site along with the portion of the activity that is expected inside two consecutive distance thresholds for that antenna according to the coverage between said thresholds. These portions of cell activity expected in each sub-zone according to the coverage in said sub-zone are called distance factors. In other words, said distance factors are defined as the portion of the cell activity that is assigned to different cell sub-zones (sub-polygons) according to the cell coverage as a function of the distance from the cell site of said sub-zones. In an embodiment, besides the cell coverage, other factors can be taken into account to assign the distance factors.

Said distance factors are obtained taking into account the antenna coverage in each zone. That is, depending on the cell coverage in each zone, a portion of the activity (distance factor) is assigned to each zone. For example, if most of the coverage is concentrated close to the antenna the distance factor will be very high in the zone close to the antenna and very low in the zones far from the antenna. For example, if the cell coverage is very high in a radio of 550 meters from the antenna, much lower in a radio between 550 meters and 1100 meters and very low in a radio higher than 110 meters, the distance factors in said cell could be:

90% of its activity (distance factor 0.9) between 0 and 550 meters

7% of its activity (distance factor 0.07) between 550 meters and 1100 meters

3% of its activity (distance factor 0.03) between 1100 meters and 1650 meters (here a maximum distance of 1650 meters for the coverage area is supposed)

In the above example, distance factors have been used with a unity basis (the sum of all the distance factors must be 1). Of course, other types of distance factors can be used.

There is no need that all the cells share the same set of distance thresholds. That is, different thresholds can be used for each cell.

The values of the distance factors (cell activity percentages as a function of the distance) do not always have to decrease as the distance increases. The base stations can be configured in a way that their intended coverage is maximum (maximum power received) at a certain distance from it, leaving the land nearest to the base station with a low distance factor (activity percentage) so the activity will be higher at said certain distance than at a low distance from the base station. Natural or artificial obstacles (mountains, valleys, buildings . . . ) can also affect how the radio signal propagates and, so, how the base station activity varies depending on the distance.

In order to calculate said distance dependence, many different procedures known from the prior art can be followed. The specific process used to estimate said distance factor is not an object of this invention.

This distance dependence can be obtained for example by means of elaborated mathematical models that take into account factors as the signal propagation, the interference from neighboring antennas, the orography, the distribution of buildings in each cell . . . .

This distance dependence can be also obtained based in direct measurements of the cell signal in different parts of the area covered by the cell. It can also be obtained from measurements of the radio signal interchanged between the base station and the user equipments connected to the network, as the time delay, received power measurements, SNR . . . .

This distance dependence can also be obtained by associating the reports of the different user equipments (e.g. mobile terminals) with the location of said user equipment in the cell coverage area. This location can be for example obtained by the mobile terminal itself (for example with a GPS) and reported to the network by the mobile terminal.

Once the distance dependence is obtained by any of the available procedures, it can be expressed as the set of distance thresholds and associated distance factors as explained before.

Said distance factors will be used in another step to subdivide the cell polygon in smaller sub-polygons as it will be explained below.

In case the coverage is considered to be the same in all the coverage area (for example, because there is no information of coverage as a function of the distance) said distance factor is not available. In an embodiment, in this case a distance factor of 1 is assigned to all the cell coverage area (meaning that the coverage associated to the cell does not vary depending on the distance from the antenna).

Obtain and Prepare Grid Information

Typically a grid is used to divide a wide area where a certain analysis is to be performed (called area of interest) into a set of adjacent non intersecting zones, called tiles.

The total area covered by the grid (the area of interest) can be as wide as the whole area covered by the cellular communications network (e.g. a whole country) but, for simplicity purposes, smaller areas can be used (as for example a city, a province or generally speaking, any certain zone of the coverage area where, for any reason, an analysis is to be performed).

There can be zones inside the total area of interest that are not covered by any grid tile, if it is known that the cellular network do not cover those zones (that is, the grid can have "holes"). But, in general, the grid is a continuous set of adjacent tiles that can be seen as a division of a wide area in non-overlapping parts.

It is common that the shape and size of the tiles is the same over the wide area. It is also common that the tiles are simple regular polygons that can be put together to fully cover the plane (triangles, squares, hexagons . . . ). The present invention is not limited to a certain type of tiles, it can use arbitrary grid tiles and their shapes and sizes can vary along the covered wide area.

The grid tiles receive an identifier (tile_ID) and are represented by polygons determined by their vertices' planar coordinates (usually, using the same reference system as the one used for the antennae locations to make the calculations easier and faster). In other words, it can be said that each tile is defined (characterized) by its location and its geometric information (for example, size and shape), said location and geometric information may be given by their vertices' planar coordinates so the vertices' planar coordinates of the tile define each tile For the purpose of the present invention, the size of the grid tiles is small, usually quite smaller than the cell coverage polygons. The grid is designed using maps of the country (with information about the location of cities, lakes, rivers . . . , orography . . . ) and with additional information as for example, antennae density, population density . . . . In order to better represent the network activity, the grid may be denser (with smaller tiles) in places with a high density of antennae or high population and less dense (with bigger tiles) in places with a low density of antennae or low population.

A land use factor is assigned to each grid tile, as an attribute. The land use factor is a parameter which expresses the portion of the tile area where it is possible to have network activity according to the characteristics of the area (e.g geographical or orographical characteristics, type of constructions in the area . . . ). So the land use factor is a sort of measurement or estimation of the "potential" network activity in each tile area depending on the characteristics of the area.

In an embodiment, it is a value between 0 and 1. When there cannot be network activity in most of the tile area (i.e. it is foreseeable that there will be almost none network activity in most of the tile area because, for example the tile cover a lake, the land around a small road distant from any city or village or any zone where little network activity is to be expected), the value of this factor associated to said tile is very low (near zero). When there can be network activity in practically all the tile area (i.e. it is foreseeable that the network activity in most of the tile area can be high because, for example, the tile cover a central part of a big city, a shopping center or any other zone where high network activity is to be expected), the value of this factor associated to said tile is very high (e.g. near one if a unity basis is used for the land use factor).

The land use factor allows comparing between grid tiles, giving an indication of how much likely is it to find activity in one tile compared to other neighboring tiles with the same area. Multiplying the tile area by its land use factor produces an "effective area"; that is, the area able to receive network activity in that tile.

In order to compute the land use factor for a tile, the area covered by the tile could be divided into parts with different "usages". For example, these usages can be "water", "buildings", "roads", "land" . . . . Or even it can be more specific, for example, distinguishing between different sort of buildings (shopping centers, office buildings, houses, factories . . . ). Then the area able to receive activity is obtained by weighting the different parts according to their use (it is much more likely to have more activity in "buildings" than in "water", or in a shopping center than in factories), adding those weighted parts, and dividing by the total area to obtain the land use factor between 0 and 1.

This is only a way of computing said land use factor. Other ways of computing the portion of the tile area where it is possible to have network activity (i.e. the land use factor) could be used.

Define (Generate) Cell Coverage Polygons

As explained before, each cell is assumed to give coverage to a certain area, which can be represented by a coverage polygon associated to that cell. The cell coverage polygons (also called cell polygons) are calculated from the information obtained for the cells (for example, from the information obtained in the first step of the method). Many different procedures known from the prior art can be used to obtain (define) the cell polygons. The selection of one of these procedures will depend on the available resources and additional information available.

In an embodiment, the cell polygons are represented (defined) by their vertices' planar coordinates, independently of the specific procedure used to obtain those polygons. If the reference system used for the planar coordinates is the same as the one used for all the geometric data (antennae location, tiles vertices coordinates . . . ), the calculations are simplified and speeded up and errors are avoided.

The specific process used to obtain said cell polygons is not an object of this invention.

As an example, some alternatives for generating (defining) the cell polygons are presented.

Voronoi polygons. Given a set of reference points (in the present case, the antennae locations) the Voronoi polygons are those whose interior consists of all points in the plane which are closer to a particular reference point than to any other. Thus, each Voronoi polygon is associated to each antenna cell and the resulting coverage assumes that the network activity is always managed by the nearest cell.

The tessellation made to obtain the Voronoi polygons has to be applied independently for the different technologies in the cellular network. That is, for example 2G and 3G antennae are in fact seen as "independent" networks (layers). Each one tries to give coverage to a full area, and each one produces its own set of Voronoi polygons for that area.

The resulting Voronoi polygons are, by definition, non-overlapping between them in the same layer. But the polygons from different layers (technologies) can overlap.

In case a resulting Voronoi polygon expands beyond the limit of the maximum distance the radio signal from that antenna can reach, it is clipped by a circular polygon with a radius equal to that maximum distance.

In the case of sectored antennae, there are several of them whose coordinates can be the same (they are located in the same mast). As the Voronoi algorithms cannot manage several points in the same place, the sectored antennae can be processed by moving them a small distance (for example, 1 meter) in their respective azimuth direction (that will be different for each sector in the same mast), before applying the Voronoi algorithm. Another alternative is to leave just one point in the sectored antenna mast, apply Voronoi, and divide the resulting polygon in sectors according to the azimuth directions.

Figure 1:
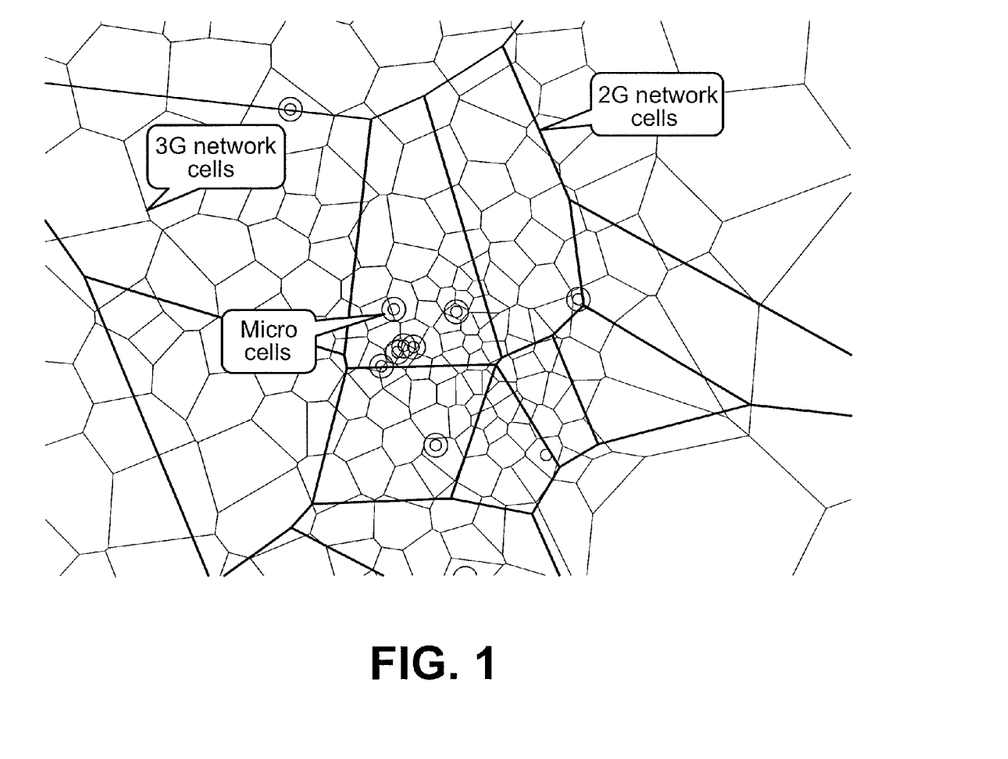
FIG. 1: It shows a representation of the cell polygons in a certain area using Voronoi and circular polygons.

The Voronoi polygons are complemented by additional "independent" polygons corresponding to cells that are designed specifically to give independent coverage to a usually small area. This is the case of "micro", "pico", "femto" cells whose coverage polygons are usually modelled as pseudo-circles (regular polygons with a high number of vertices). These polygons can overlap between them and with the Voronoi polygons in different layers. FIG. 1 illustrates how the Voronoi and circular polygons look for a certain area.

Prototypical polygons (circular sectors). This procedure works on each antenna independently and produces a prototypical polygon whose size and shape depends on several antenna parameters. The prototypical polygon is usually derived from a circular sector, but others can be used (for example, lemniscates, cardioids . . . ).

The prototypical polygons can overlap between them even if they belong to the same layer, instead of making an exclusive non-overlapped division of the plane (that is what the Voronoi algorithm does). This characteristic reflects better the way antenna cells really behave.

The parameters used for the circular sectors are:

Radius. It gives the distance from the antenna to the furthest point whose activity can be served by that antenna. This information can be directly available, or can be derived from other data (antenna power and frequency, data from neighbouring antennae, signal attenuation models . . . ). It can also be estimated, for example, by doing a Voronoi tessellation, finding the furthest point in the polygon in the antenna azimuth (plus beamwidth) and multiplying by a factor.

Azimuth. Direction to which the antenna is oriented.

Beamwidth. Width of the antenna main lobe.

Back propagation radius. Though sectored antennae are designed to cover the area around its azimuth direction (main lobe) there are also secondary lobes that cover areas near the antenna in others directions. The back propagation radius is used to add a circular coverage area around the antenna that is combined (by an union of polygons) with the circular sector.

Subdivide Cell Coverage Polygons in (Sub)Polygons According to the Information of Coverage as a Function of the Distance from the Antenna Once the cell coverage polygons have been obtained, sub-polygons are generated by dividing each cell coverage polygon in pieces according to the information of coverage as a function of the distance. Each resulting piece (sub-polygon) will be assigned a portion of the cell activity determined by the distance factor obtained for each distance interval, as described before. In other words, to each sub-polygon a single certain value of the distance factor calculated from the information of coverage as a function of the distance, is assigned.

In an embodiment, each sub-polygon is generated (defined by) intersecting the total cell coverage polygon by a circular annulus with interior radius and exterior radius equal to the threshold limits of its distance interval.

Figure 2:
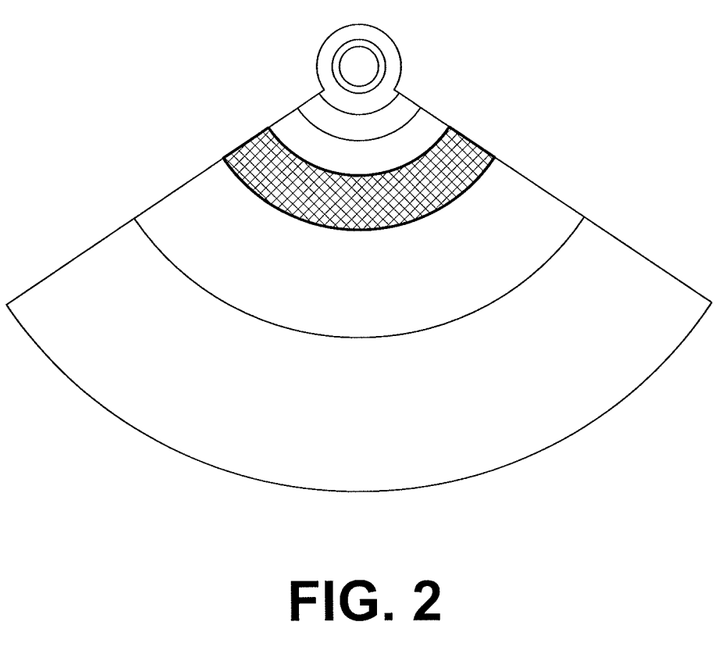
FIG. 2: It schematically shows the division in sub-polygons of a cell polygon based on circular sectors according to an embodiment of the invention.

As an example, FIG. 2 illustrates how a cell polygon based on a circular sector is subdivided. As an example, the sub-polygon that is highlighted in the figure has a distance factor of 0.08 (8% of the cell activity is assigned to this sub-polygon), and this portion of the activity is located between 8800 and 13200 meters.

Though the previous example shows how a prototypical polygon based on a circular sector is sub-divided, this can be done for any other kind of coverage polygons (obtained by means of a Voronoi algorithm or any other procedure).

In an embodiment, the cell sub-polygons are represented (defined) by their vertices' planar coordinates, independently of the specific procedure used to obtain those polygons. If the reference system used for the planar coordinates is the same as the one used for all the geometric data (polygons, antennae location, tiles vertices coordinates . . . ), the calculations are simplified and speeded up and errors are avoided.

In case there is no information of coverage as a function of the distance or it is considered that the coverage is constant in all the coverage cell independent on the distance to the antenna, the cell coverage polygon is not subdivided (or in other words, only one sub-polygon is generated for said cell polygon and said sub-polygon is equal to the cell polygon) and, in an embodiment, it is assigned a distance factor of 1 (all the cell activity takes place in the only polygon).

Calculate Partial Dispersion Factors from Land Use Weighted Intersection Areas Between Cell Coverage Polygons and Grid Tiles Once all the cell coverage polygons have been determined, this step calculates the areas of the intersection of each polygon with the grid tiles. The term "polygons", may refer to total cell coverage polygons (when no information of coverage dependent on the distance from the antenna is used, that is, no sub-polygons have been generated according to the previous step) or to sub-polygons (when the distance information is used to subdivide them, as described in the previous step).

The portion of a cell activity that is assigned to a particular grid tile is made proportional to the area of their intersection. That is the reason why the intersections between cell polygons and grid tiles are calculated.

Figure 3:
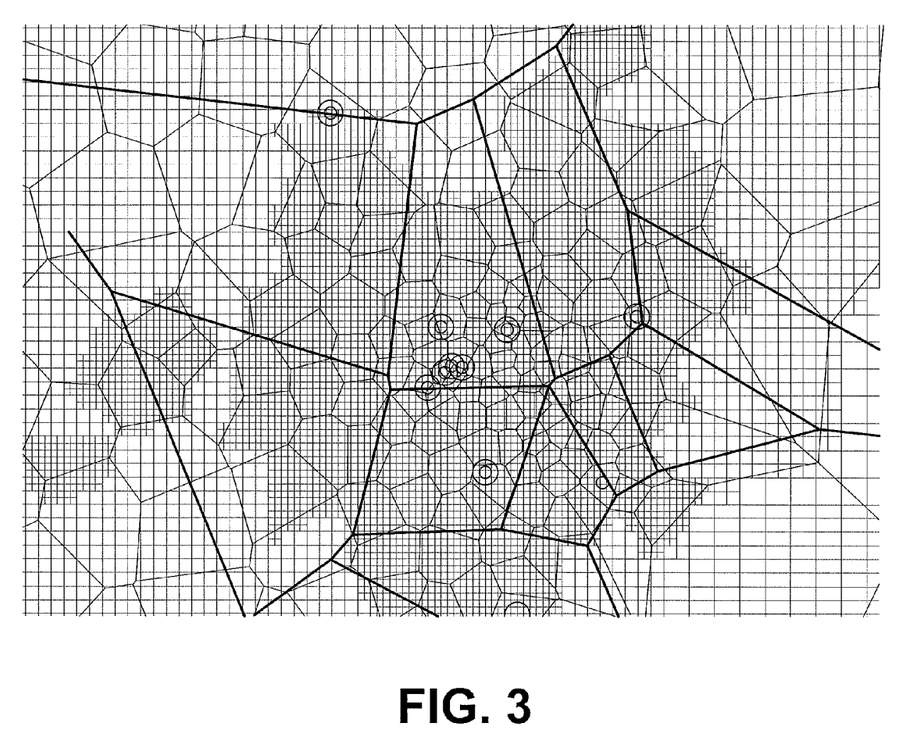
FIG. 3: It schematically shows a set of cell coverage polygons and the underlying grid tiles according to an embodiment of the invention.

FIG. 3 shows a set of cell coverage polygons and the underlying grid tiles. In this example the coverage polygons are Voronoi polygons and circular polygons, and the grid tiles are squares of variable size, though any other kind of cell polygons and tiles can be used. In this figure, overlapped polygons from different layers (technologies) are shown. This figure illustrates the intersections between coverage polygons and grid tiles.

As the final purpose is to disperse the activity according to the different types of land use, in an embodiment, the intersecting areas are multiplied by the land use factor of each corresponding intersecting grid, so the "effective" intersecting areas are obtained.

All the activity from a given cell polygon has to be dispersed, so the portion of its activity dispersed to one particular grid tile, in an embodiment, is taken as the effective intersecting area between the cell polygon and the grid tile, divided by the sum of all the effective intersecting areas of the cell polygon with any grid tile.

In order to show how said partial dispersion is calculated according to an embodiment of the present invention, two scenarios are going to be considered:

1) The cell polygon has not been subdivided in smaller sub-polygons.

In this case, let's see a simple example where there is a particular cell polygon, $C_i$ which intersects with N grid tiles, $T_j$, where j=1, 2 . . . N.

Their intersecting areas are: $A_{i,j}$

If the land use factors for each tile j is given by $LUF_j$, the effective intersecting areas EA are:

$$EA_{i,j} = A_{ij} \cdot LUF_j$$

And the partial dispersion factor from $C_i$ to $T_j$ is:

$$pdisp_{i,j} = \frac{EA_{i,j}}{\sum_{j=1}^{N} EA_{i,j}}$$

The sum of all the partial dispersion factors for a given cell polygon will be equal to 1, that is: $\Sigma_{j=1}^{N} pdisp_{i,j} = 1$ 2) The cell polygon has been subdivided in smaller sub-polygons.

Consider the M sub-polygons associated to cell i, $C_{ik}$, where k=1, 2 . . . M whose associated distance factors are $dist_{ik}$. The distance factor indicates the portion of cell i activity assigned to sub-polygon $C_{ik}$ (according to the coverage as a function of the distance from the antenna). The sum of all the distance factors for a given cell is 1:

$$\Sigma_{k=1}^{M} dist_{ik} = 1.$$

In this case, in a similar way as explained in the previous scenario, the intersections between a sub-polygon $C_{ik}$ (that is, the sub-polygon k of cell i) and the grid tiles will be considered. For example, assume a simple example where we have a particular cell sub-polygon, $C_{ik}$, that intersects with N grid tiles, $T_j$, where j=1, 2 . . . N. Their intersecting areas are: $A_{ik,j}$ (this area can be expressed using any of the known area measurements, for example square meters, square kilometers . . . ).

If the land use factors for each tile j is given by $LUF_j$, the effective intersecting areas EA are:

$$EA_{ik,j} = A_{ik,j} \cdot LUF_j$$

In this case, the partial dispersion factor from sub-polygon $C_i$ to $T_j$ will include the distance factor of sub-polygon $C_{ik}$:

$$pdisp_{ik,j} = dist_{ik} \cdot \frac{EA_{ik,j}}{\sum_{j=1}^{N} EA_{ik,j}}$$

These partial dispersion factors take into account both the information of coverage as a function of the distance to the antenna (the cell site) and the land use information.

Obtain Final Dispersion Factors from Each Cell to Each Grid Tile and Create the Cell to Grid Lookup Table As it was commented before, a cell polygon can in fact be divided in cell sub-polygons obtained by dividing the total cell polygon according to the information of coverage as a function of the distance.

More than one sub-polygon of the same cell $C_i$ can disperse activity to the same grid tile $T_j$ (that is, more than one of the same cell sub-polygons intersect with the same grid tile). So these contributions are added to obtain the final dispersion factor from cell $C_i$ to tile $T_j$. If there are L sub-polygons of $C_i$ that disperse activity to the same grid tile $T_j$:

$$disp_{i,j} = \sum_{k=1}^{L} pdisp_{ik,j}$$

In the cases where the cell polygon has not been divided in sub-polygons, there will be only one polygon in each cell, so only one polygon of each cell will intersect with the same grid tile (L=1), so the final dispersion will be equal to the partial dispersion.

In an embodiment, a lookup table from cell to grid is created. This lookup table contains all the combinations of cellIDs and gridIDs that have an intersection, along with the final dispersion factor computed as it has been described before. So the format is:

cellID ($C_1$), gridID ($T_j$), dispersion factor ($disp_{i,j}$)

In order to obtain the activity $Tact_j$ of a particular grid tile $T_j$, all the cells contributing activity to that grid tile are found in the lookup table. The cells contributing activity to a certain tile will be the cells whose polygon (or any of its sub-polygons if the cell polygon is divided in sub-polygons) intersects with said certain tile. Let us assume that P contributing cells are found. Then, the network activity $Cact_i$ for one cell $C_i$ is multiplied by its associated dispersion factor, and the results are added.

$$Tact_j = \sum_{i=1}^{P} (Cact_i \cdot disp_{i,j})$$

As stated before, this network activity depend on many different parameters and it can be therefore measured and expressed directly or indirectly in many different ways, for example, the traffic load and/or the number of calls and/or the bandwidth occupied and/or number of SMSs or number of users using a certain communications service . . . .

The present invention allows to assign network activity to land areas taking into account the physical characteristics of the land and the coverage of the cell as a function of the distance to the antenna allowing therefore an efficient network design and management optimization. The mathematic formulae stated in the above paragraphs have been presented only as one possible example of calculating the dispersion factors and the network activity assigned to each grid tile taking into account the land use factor of each grid tile and the information of the coverage as a function of the distance, but the present invention is not limited to the use of said formulae.

A person of skill in the art would readily recognize that said dispersion factors can be calculated in many different ways (using different mathematic formulae) also covered by the present invention.

Figure 4:
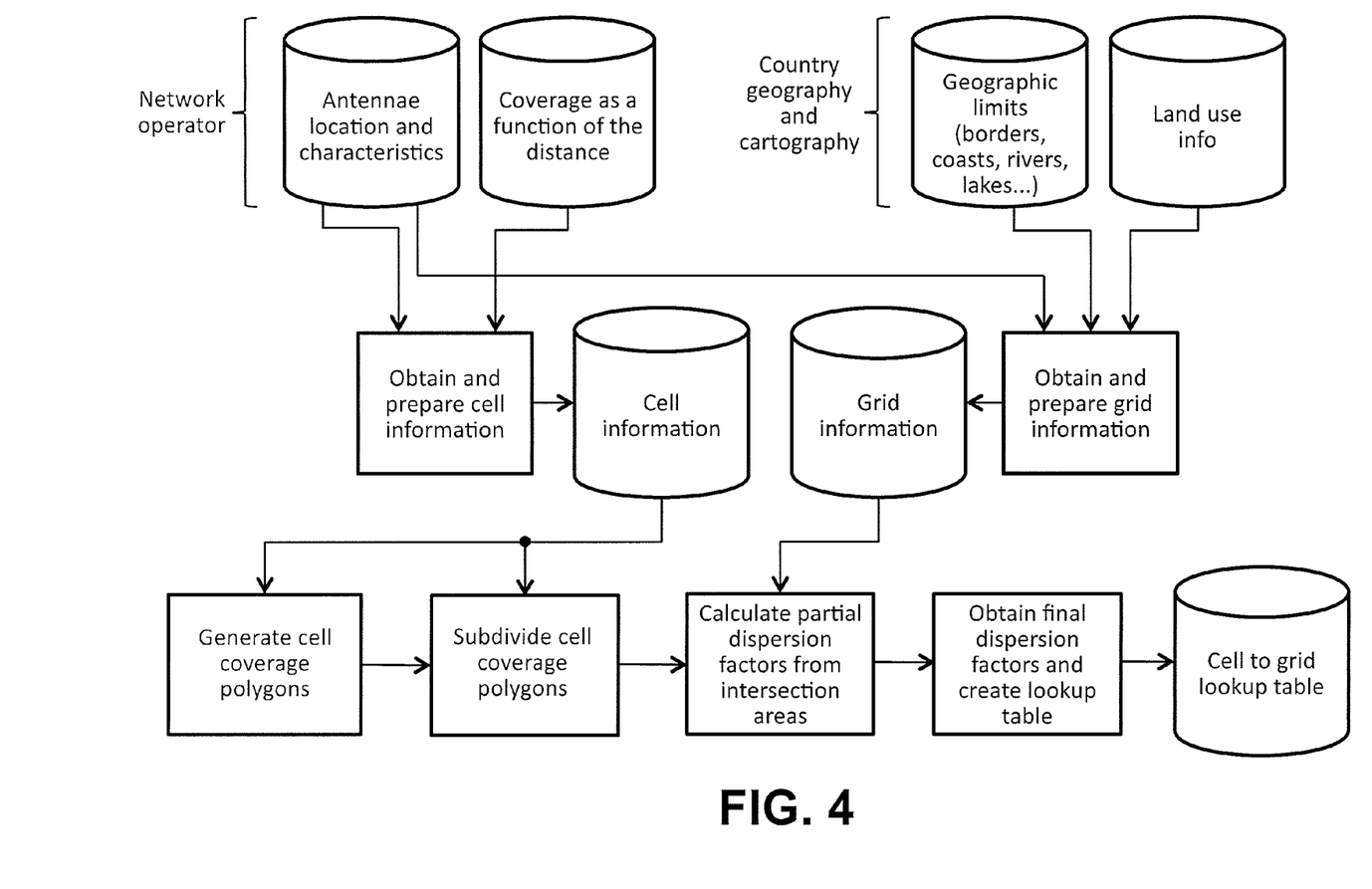
FIG. 4: It schematically shows in a block diagram the global architecture and operation of an embodiment of the invention.

Once the steps have been described, the global architecture according to an embodiment of this invention is summarized in FIG. 4.

First the cell information (including antenna locations and other characteristics) is obtained. Optionally, information about coverage as a function of the distance is also obtained. Said information is obtained (usually from the network operator) and prepared to be used for generating the cell coverage polygons and for generating the sub-polygons (if any).

Geographic information (as borders, coasts, rivers . . . ) and the land use information is obtained. Said information can be obtained from geography and cartography of the area of interests.

Said information (together with other information, as the information about the antenna locations) is used to prepare the grid information.

From the grid information and the cell polygons obtained, the intersection areas are obtained, and from there, as disclosed in the above paragraphs, the partial dispersion factors are obtained.

Then, taking into account the sub-polygons of the same cell, which intersects with the same grid tile, the final dispersion for each cell and tile is obtained and a look up table including the final dispersion factor for each cell and tile may be built.

Summarizing, the present invention allows representing the activity of a cellular network on a set of tiles in a grid covering a certain land area, instead of representing it associated to antenna cells that might or might not overlap. The activity dispersed and assigned to non-overlapping grid tiles is much simpler and clearer to understand and allows visualizing how the network activity is distributed over the space and how it varies along time. Some prior art proposals solve the overlapping problem by assuming that the cells are themselves not overlapping, partitioning the space with methods like Voronoi tessellation. The present proposal is more general as it can work both with that kind of coverage maps, and the more realistic ones with overlapping coverage cells.

The way the coverage varies inside a cell polygon depending on the distance from the antenna (coverage as a function of the distance) allows obtaining better results when dispersing cell activity to grid tiles, improving those results respect to the simplification that considers uniform distribution of the activity inside the coverage polygon. The land use factor allows assigning the activity to the grid tiles depending on the land use characteristics of the terrain. The land use dispersed activity is preferably assigned to grid tiles with higher land use factor, whereas grid tiles with lower land use factor will receive lower activity values.

Even though many of the presented embodiments are referred to cellular communications networks, the present invention is not limited to cellular communications network but it can be applied to other communications networks.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention.

Although the present invention has been described with reference to specific embodiments, it should be understood by those skilled in the art that the foregoing and various other changes, omissions and additions in the form and detail thereof may be made therein without departing from the scope of the invention as defined by the following claims.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for assigning network activity of a cellular communications network to land areas of a certain area of interest, said cellular communications network serving a group of cells each one being served by at least one antenna, the method comprising the following steps performed by an electronic device:
    a) For each cell of the group of cells, obtaining cell information and information of the cell coverage as a function of the distance from the antenna, where said cell information includes location information of the antenna serving the cell
    b) Dividing said area of interest into a set of adjacent non intersecting zones called tiles and assigning to each tile a land use factor, being said land use factor a parameter which indicates the portion of the tile area where it is possible to have network activity
    c) For each cell of the group of cells, defining a cell coverage polygon
    d) For each cell coverage polygon, defining one or more sub-polygons according to the information of the cell coverage as a function of the distance from the antenna and assigning to each sub-polygon a distance factor being said distance factor a parameter which indicates the portion of the cell activity that it is assigned to each sub-polygon
    e) Calculating intersection areas between each tile and each cell sub-polygon and weighting each intersection area by the tile land use factor of the correspondent tile,
    f) For each tile and each cell, determining a dispersion of the network activity of said cell in said tile based on the weighted intersection areas between said tile and the sub-polygons of said cell and the distance factor assigned to each sub-polygon of said cell.

2. A method according to claim 1 further comprising, creating a table with contains, for all the combination of cells and tiles that have an intersection, the dispersion value for said cell and said tile.

3. A method according to claim 1 further comprising: obtaining the network activity of a particular tile by, for each cell with any of its sub-polygons having an intersection with the tile, applying the dispersion value for said tile and for said cell to the network activity of said cell and adding the obtained results for all the cells with any of its sub-polygons having an intersection with the tile.

4. A method according to claim 1 where step of determining the dispersion of the network activity for each tile and each cell comprises:
    f1) For each tile and each cell, calculating a partial dispersion factor for each sub-polygon of said cell as the weighted intersection area between said tile and said sub-polygon multiplied by the distance factor of said sub-polygon and divided by the sum of all the weighted intersection areas of said sub-polygon of said cell with any tile;
    f2) Calculating the dispersion of the network activity for each combination of tile and cell as the sum of the partial dispersion factors of all the sub-polygons of said cell which intersects with said tile.

5. A method according to claim 1 where the cell information includes also at least one of the following: a cell identifier, type of the cell, type of antenna, type of technology used by the cellular communications network, azimuth and beam width.

6. A method according to claim 1 where the electronic device is installed in one node of the cellular communications network.

7. A method according to claim 1 where the coverage polygons are generated using at least part of the cell information obtained in step a).

8. A method according to claim 1 where in the step of defining the cell coverage polygons, Voronoi polygons are used or circular sectors polygons are used.

9. A method according to claim 1 where said coverage polygons are generated according to the cell type of antenna.

10. A method according to claim 1 where said coverage polygons are divided in layers according to different types of technology used in the cells.

11. A method according to claim 1 where if, according to the information of coverage as a function of the distance, it is considered that the coverage of a certain cell is constant in all the cell independent on the distance to the antenna, only one sub-polygon is defined for said cell, being said sub-polygon equal to the cell coverage polygon and it is assigned a distance factor of 1 to said sub-polygon.

12. A method according to claim 1 where the cell information and the information of the cell coverage as a function of the distance from the antenna are transmitted to the electronic device by a node of the cellular communications network.

13. An electronic device for assigning network activity of a cellular communications network to land areas of a certain area of interest, where said area of interest is divided into a set of adjacent non intersecting zones called tiles, said cellular communications network serving a group of cells each one being served by at least one antenna, the electronic device comprising:

Means for, for each cell of the group of cells, obtaining cell information and information of the cell coverage as a function of the distance from the antenna, where said cell information includes location information of the antenna serving the cell;

Means for assigning to each tile a land use factor, being said land use factor a parameter which indicates the portion of the tile area where it is possible to have network activity;

Means for, for each cell of the group of cells, defining a cell coverage polygon;

Means for, for each cell coverage polygon, defining one or more sub-polygons according to the information of the cell coverage as a function of the distance from the antenna and assigning to each sub-polygon a distance factor being said distance factor a parameter which indicates the portion of the cell activity that it is assigned to each sub-polygon;

Means for calculating intersection areas between each tile and each cell sub-polygon and weighting each intersection area by the land use factor of the correspondent tile; and Means for, for each tile and each cell, determining a dispersion of the network activity of said cell in said tile based on the weighted intersection areas between said tile and the sub-polygons of said cell and the distance factor assigned to each sub-polygon of said cell.

14. A non-transitory computer program product comprising:
   computer-executable instructions for performing, when the program is run on a computer, a method for assigning network activity of a cellular communications network to land areas of a certain area of interest, said cellular communications network serving a plurality of cells, each cell being served by at least one antenna, the method comprising the following steps performed by an electronic device
   (a) for each respective cell of the plurality of cells, obtaining cell information and cell coverage information based on a distance from the respective cell to the at least one antenna,
      said cell information comprising location information of the at least one antenna serving the respective cell;
   (b) dividing said area of interest into a plurality of tiles and assigning to each respective tile a land-use factor,
      the plurality of tiles being a set of adjacent non-intersecting zones,
      said land-use factor being a land-use parameter,
      the land-use parameter indicating a network-activity portion of the tile area, the network-activity portion defining where it is possible to have network activity in the respective tile,
   (c) for each cell of the plurality of cells, defining a cell coverage polygon;
   (d) for each cell coverage polygon,
      defining at least one sub-polygon according to the cell-coverage information based on the distance from respective cell to the at least one antenna, and
      assigning to each sub-polygon a distance factor based on a cell-activity parameter,
         the cell-activity parameter indicating the portion of the cell activity assigned to each sub-polygon;
   (e) calculating intersection areas between each tile and each cell sub-polygon and weighting each intersection area by the land-use factor of the respective tile; and
   (f) for each tile and each cell, determining a dispersion value of the network activity said cell in said tile based on
      the weighted intersection areas between said tile and
      the sub-polygons of said cell and the distance factor assigned to each sub-polygon of said cell.

15. A non-transitory digital data storage medium encoding a machine-executable program of instructions to perform a method for assigning network activity of a cellular communications network to land areas of a certain area of interest, said cellular communications network serving a plurality of cells, each cell being served by at least one antenna, the method comprising the following steps performed by an electronic device
   (a) for each respective cell of the plurality of cells, obtaining cell information and cell coverage information based on a distance from the respective cell to the at least one antenna,
      said cell information comprising location information of the at least one antenna serving the respective cell;
   (b) dividing said area of interest into a plurality of tiles and assigning to each respective tile a land-use factor,
      the plurality of tiles being a set of adjacent non-intersecting zones,
      said land-use factor being a land-use parameter,
      the land-use parameter indicating a network-activity portion of the tile area, the network-activity portion defining where it is possible to have network activity in the respective tile,
   (c) for each cell of the plurality of cells, defining a cell coverage polygon;
   (d) for each cell coverage polygon,
      defining at least one sub-polygon according to the cell-coverage information based on the distance from respective cell to the at least one antenna, and
      assigning to each sub-polygon a distance factor based on a cell-activity parameter,
         the cell-activity parameter indicating the portion of the cell activity assigned to each sub-polygon;
   (e) calculating intersection areas between each tile and each cell sub-polygon and weighting each intersection area by the land-use factor of the respective tile; and
   (f) for each tile and each cell, determining a dispersion value of the network activity of said cell said tile based on
      the weighted intersection areas between said tile and
      the sub-polygons of said cell and the distance factor assigned to each sub-poly on of said cell.

* * * * *